(12) United States Patent
Braude

(10) Patent No.: US 8,954,929 B2
(45) Date of Patent: Feb. 10, 2015

(54) AUTOMATICALLY REDIRECTING METHOD CALLS FOR UNIT TESTING

(75) Inventor: Michael J. Braude, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1198 days.

(21) Appl. No.: 12/748,469

(22) Filed: Mar. 29, 2010

(65) Prior Publication Data
US 2011/0239194 A1 Sep. 29, 2011

(51) Int. Cl.
*G06F 9/44* (2006.01)
*G06F 11/36* (2006.01)

(52) U.S. Cl.
CPC .................. *G06F 11/3688* (2013.01)
USPC ............. 717/124; 717/134; 717/135

(58) Field of Classification Search
None
See application file for complete search history.

(56) References Cited

U.S. PATENT DOCUMENTS

| | | | | |
|---|---|---|---|---|
| 5,339,430 | A * | 8/1994 | Lundin et al. | 719/332 |
| 6,044,224 | A * | 3/2000 | Radia et al. | 717/162 |
| 6,072,953 | A | 6/2000 | Cohen et al. | |
| 6,282,701 | B1 * | 8/2001 | Wygodny et al. | 717/125 |
| 6,351,843 | B1 | 2/2002 | Berkley et al. | |
| 6,779,187 | B1 * | 8/2004 | Hammond | 719/331 |
| 6,898,788 | B2 * | 5/2005 | Kosaka et al. | 717/162 |
| 6,957,422 | B2 * | 10/2005 | Hunt | 717/130 |
| 6,968,540 | B2 * | 11/2005 | Beck et al. | 717/130 |
| 7,111,279 | B2 * | 9/2006 | Gazdik et al. | 717/110 |
| 7,117,484 | B2 * | 10/2006 | Hartman et al. | 717/126 |
| 7,293,260 | B1 * | 11/2007 | Dmitriev | 717/130 |
| 7,353,507 | B2 * | 4/2008 | Gazdik et al. | 717/159 |
| 7,370,360 | B2 * | 5/2008 | van der Made | 717/134 |
| 7,437,715 | B2 * | 10/2008 | Chatsinchai et al. | 717/134 |
| 7,461,385 | B2 * | 12/2008 | Winter | 717/134 |
| 7,689,985 | B2 * | 3/2010 | Callender | 717/175 |
| 7,752,607 | B2 * | 7/2010 | Larab et al. | 717/135 |
| 7,788,647 | B2 * | 8/2010 | Martin et al. | 717/135 |
| 7,873,872 | B1 * | 1/2011 | Shillington et al. | 717/124 |
| 7,873,945 | B2 * | 1/2011 | Musuvathi et al. | 717/124 |
| 7,900,258 | B2 * | 3/2011 | van der Made | 717/134 |

(Continued)

OTHER PUBLICATIONS

Hunt, Brubacher, "Detours: Binary INterception of Win32 Functions"; 1999, Proceedings of the 3rd USENIX Windows NT symposium; [retrieved on Oct. 12, 2012]; Retrieved from Internet <URL: http://research.micorsoft.com/pubs/68568/huntusenixnt99.pdf>; pp. 1-9.*

(Continued)

*Primary Examiner* — Xi D Chen
(74) *Attorney, Agent, or Firm* — Kevin Sullivan; Kate Drakos; Micky Minhas

(57) ABSTRACT

A unit testing system allows testing of multiple types of method calls using an unmodified software application module. The system dynamically copies byte code of the tested method, clones the byte code, and executes the cloned byte code. During cloning, the system instruments the code so that method calls are redirected into a system method, where the system can determine whether a mocked method should be called instead. The result is that the developer does not need to modify the original methods in order to redirect method calls to mock methods. The developer can simply reference a test module of the unit testing system and easily write tests that redirect any method they wish. Thus, the unit testing system provides a framework for building more useful unit tests that cause less interference with production-ready code.

20 Claims, 3 Drawing Sheets

(56) References Cited

U.S. PATENT DOCUMENTS

| | | | | |
|---|---|---|---|---|
| 7,926,042 | B2* | 4/2011 | Mehta et al. | 717/130 |
| 7,930,683 | B2* | 4/2011 | Li | 717/124 |
| 7,971,090 | B2* | 6/2011 | Nan et al. | 717/124 |
| 7,984,429 | B2* | 7/2011 | Hunt | 717/130 |
| 8,209,669 | B2* | 6/2012 | Schneider et al. | 717/135 |
| 8,225,293 | B2* | 7/2012 | Correa | 717/130 |
| 8,234,633 | B2* | 7/2012 | Schneider et al. | 717/135 |
| 8,245,194 | B2* | 8/2012 | Atkin et al. | 717/124 |
| 8,261,244 | B2* | 9/2012 | Pietrek | 717/130 |
| 8,407,678 | B2* | 3/2013 | Greene | 717/134 |
| 8,627,296 | B1* | 1/2014 | Picard | 717/124 |
| 8,635,582 | B2* | 1/2014 | Stellari et al. | 717/135 |
| 8,707,265 | B2* | 4/2014 | Li | 717/124 |
| 8,806,437 | B2* | 8/2014 | Arcese et al. | 717/124 |
| 2002/0049963 | A1* | 4/2002 | Beck et al. | 717/130 |
| 2004/0163077 | A1* | 8/2004 | Dimpsey et al. | 717/130 |
| 2004/0194063 | A1* | 9/2004 | Pereira | 717/124 |
| 2006/0282460 | A1* | 12/2006 | Pandya et al. | 707/103 R |
| 2007/0261044 | A1* | 11/2007 | Clark | 717/162 |
| 2008/0301635 | A1 | 12/2008 | Khan | |
| 2009/0007073 | A1* | 1/2009 | Huang et al. | 717/124 |
| 2009/0064113 | A1 | 3/2009 | Langman et al. | |
| 2009/0144714 | A1 | 6/2009 | Fan et al. | |
| 2010/0218172 | A1* | 8/2010 | Randimbivolona | 717/135 |
| 2012/0084754 | A1* | 4/2012 | Ziegler et al. | 717/124 |

OTHER PUBLICATIONS

Hunt, Scott, "Intercepting and Instrumenting COM Applications"; 1999, 5th USENIX Conference on Object-Oriented Technologies and Systems; [retrieved on Oct. 12, 2012]; Retrieved from Internet <URL: http://cs.rochester.edu/u/scott/papers/1999_COOTS.pdf>; pp. 2-13.*

Sokenou, Vosgen, "FlexTest: An Aspect-Oriented Framework for Unit Testing", 2005, Springer-Verlag Berlin; [retrieved on Oct. 15, 2012]; Retrieved from Internet <URL:http://www.springerlink.com/content/1rmchet0n53Ingyj/fulltext.pdf>;pp. 257-270.*

Jefferies, "Virtual Mock Objects using AspectJ with JUNIT"; 2002, xprogramming.com; [retrieved on Dec. 19, 2013]; Retrieved from Internet <URL:xprogramming.com/articles/virtualmockobject/virtualmockobjects/>;pp. 1-5.*

Floriano, et al., "The Annotated Test Step Pattern", 2011 ACM; [retrieved on Sep. 30, 2014]; Retrieved from Internet <URL:http://dl.acm.org/citation.cfm?id=2578903>;pp. 4-13.*

Coelho, et al., "Unit Testing in Multi-agent Systems using Mock Agents and Aspects"; ACM; [retrieved on Sep. 30, 2014]; Retrieved from Internet <URL:http://dl.acm.org/citation.cfm?id=1138063>;pp. 83-89.*

Kim, et al., "Mock Object Models for Test Driven Development"; 2006 IEEE;[retrieved on Sep. 30, 2014]; Retrieved from Internet <URL:http://ieeexplore.ieee.org/stamp/stamp.jsp?tp=&arnumber=1691384>;pp. 1-8.*

Tilmann, Schulte, "Mock-object generation with behavior", 2006, IEEE; [retrieved on Sep. 30, 2014]; Retrieved from Internet <URL:http://ieeexplore.ieee.org/stamp/stamp.jsp?tp=&arnumber=4019611>;pp. 1-2.*

Chiba, Shigeru, "Javassist: Java Bytecode Engineering Made Simple", Retrieved at <<http://java.sys-con.com/node/38672 >>, Jan. 8, 2004, pp. 7.

Weisfeld, Matt, "Java Language Integrity & Security: Fine Tuning Bytecodes ", Retrieved at <<http://www.developer.com/design/article.php/3669651/Java-Language-Integrity—Security-Fine-Tuning-Bytecodes.htm >>, Apr. 4, 2007, pp. 5.

"Serp", 2007, Retrieved at <<http://serp.sourceforge.net/ >>, pp. 4.

* cited by examiner

AUTOMATICALLY REDIRECTING METHOD CALLS FOR UNIT TESTING

BACKGROUND

Modern software typically involves many components often developed by large teams of software developers. The days of procedural programming in which a single developer could write an application that simply executed from start to finish performing a single, well-defined task are gone. A software developer often uses libraries, components, frameworks, and other bodies of code written by other developers. The chances for mistakes or misunderstanding how to use a particular external function or module are higher than ever.

One verification method for increasing the correctness of software is called unit testing. When unit testing, a software developer attempts to isolate a particular unit of the software from external influences in a way that the unit can be tested in isolation. In theory, if each unit of a software application is correct, then the only room left for error is in communication between components, so unit testing can dramatically reduce software error rates. Unit tests often replace externally invoked libraries or components written by other developers with stubs or replacement objects that mimic the functionality of an external component but feed directed responses into the unit under test to test the unit's reaction to particular return values, operating conditions, and so forth.

When writing a unit test that invokes methods on objects where the method pointers are determined at compile-time (i.e., non-virtual or static), there is currently no way to redirect or "mock" these method calls so that they invoke fake methods instead. This makes it very difficult to test methods that call other methods that are non-virtual, because it is not possible to redirect these method calls without recompiling them so that they can be redirected at runtime. Existing solutions to this problem dynamically generate subclasses of classes a developer wants to mock and inject the generated subclasses into the class the developer wants to test. This method exploits polymorphism so that the invoked methods are determined at runtime, but the method only works if the base class methods are declared virtual. Another cumbersome solution is to use the Common Language Runtime (CLR) profiler application-programming interface (API), which attaches to the MICROSOFT™.NET runtime to intercept all method calls.

SUMMARY

A unit testing system is described herein that allows testing of multiple types of method calls using an unmodified software application module. The system dynamically copies byte code of the tested method, clones the byte code, and executes the cloned byte code. During cloning, the system instruments the code so that method calls are redirected into a system API, where the system can determine whether a mocked method should be called instead. The result is that the developer does not need to modify the original methods in order to redirect method calls to mock methods. The developer can simply reference a test module of the unit testing system and easily write tests that redirect any method they wish. There is a strong demand for the ability to redirect every method call in a unit test, but also to be able to do so without having to alter one's development environment. Thus, the unit testing system provides a framework for building more useful unit tests that cause less interference with production-ready code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A unit testing system is described herein that allows testing of multiple types of method calls using an unmodified software application module. The system dynamically copies byte code of the tested method, clones the byte code, and executes the cloned byte code. During cloning, the system instruments the code so that method calls are redirected into a system API, where the system can determine whether a mocked method should be called instead. The result is that the developer does not need to modify the original methods (or the methods in other assemblies that the developer's code invokes) in order to redirect method calls to mock methods instead of the ones they compiled against. The system relies on dynamically altered byte code, rather than relying on polymorphism or the CLR profiler. Unlike the polymorphism approach, the system can intercept calls to any type of method whereas polymorphism can only intercept virtual methods. Unlike the CLR profiler or other management layer APIs, the system is stand-alone and does not involve installation or setup.

The result is that a developer can simply reference a test module of the unit testing system and easily write tests that redirect any method they wish. There is a strong demand for the ability to redirect every method call in a unit test, but also to be able to do so without having to alter one's development environment. In some embodiments, the system clones the methods in a way that allows them to still be debugged as usual in a development environment (e.g., MICROSOFT™ Visual Studio). The ability to use the unit testing system with a familiar development environment allows developers to quickly resolve coding errors identified by unit testing. Thus, the unit testing system provides a framework for building more useful unit tests that cause less interference with production-ready code.

In some embodiments, the unit testing system generates an interception method for each call identified within a method. After copying the byte code of a method, the system can modify the method to change the destination of calls within the method. The interception method has the same signature as the method it replaces, which means no other byte code needs to be altered. Whenever a method is redirected into an interception method, the system can determine whether the developer has provided a unit test and wants the call to be redirected to a mock object or method. If the developer has provided a mock object, then the interception method invokes the mock object, otherwise the system invokes the original method. This way, the unit testing system can dynamically redirect any method calls to any object without needing to modify the original code and without using any profiling tools.

Figure 1:
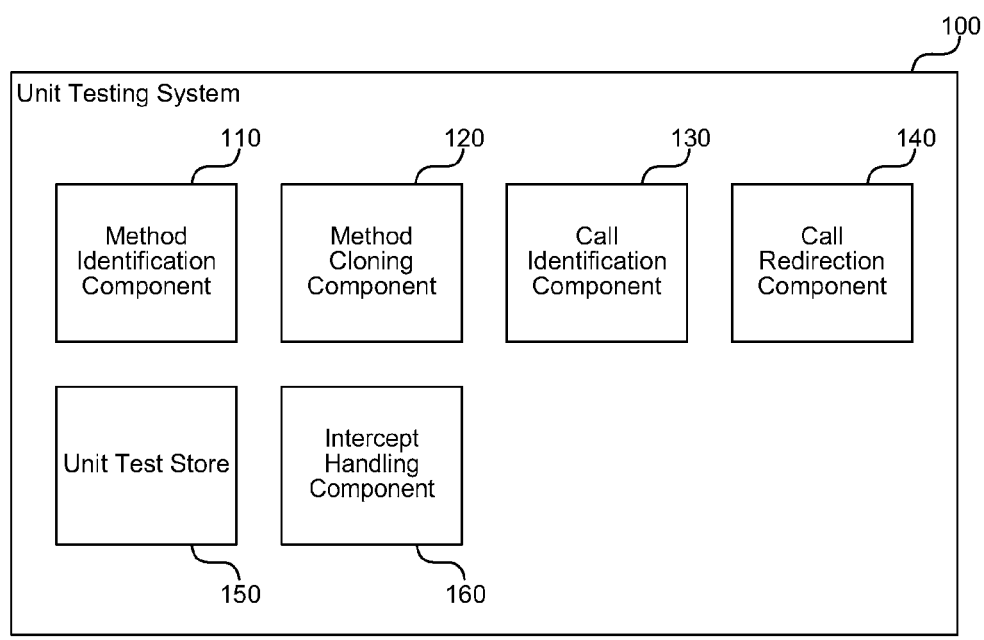
FIG. 1 is a block diagram that illustrates components of the unit testing system, in one embodiment.

FIG. 1 is a block diagram that illustrates components of the unit testing system, in one embodiment. The system 100 includes a method identification component 110, a method-cloning component 120, a call identification component 130, a call redirection component 140, a unit test store 150, and an intercept-handling component 160. Each of these components is described in further detail herein.

The method identification component 110 identifies methods in a software application. For example, if the software application is provided in a module containing byte code, then the component 110 may load the module, interpret the byte code, and identify methods defined within the byte code. For example, software applications managed by the MICROSOFT™.NET Framework are stored in modules (e.g., dynamically linked libraries (DLL), executables (EXE), or other formats) that contain byte code that can be compiled by a just-in-time (JIT) compiler before execution. The method identification component 110 can use APIs provided by the .NET Framework to identify methods within a stored application module. The methods may include static functions, virtual functions, global functions, class member functions, or other types of methods within the module.

The method-cloning component 120 clones an identified method to create a modifiable copy of the method for unit testing. The method identification component 110 may provide beginning and ending locations for an identified method within a software module, so that the method-cloning component 120 can copy the identified method by copying bytes starting at the beginning location and ending at the ending location to a new location, such as memory allocated by the system 100. By copying the identified method, the system 100 can manipulate and modify the method in ways that enhance testability without requiring modifications to the original methods (e.g., by the developer). Instead of creating a build of an application targeted just for unit testing, a developer can use the system 100 to test a production-ready version of the application and the system 100 can modify the methods to produce versions that are unit testable.

The call identification component 130 identifies calls to one or more other methods within an identified method. Opportunities for unit testing are often found at locations where a method calls another method. For example, a developer may want to test that the outer method behaves correctly when the inner method returns an error code. The developer can use the system 100 to replace the inner method with a mock method having a similar signature (e.g., number of parameters, calling convention, return type, and so forth) as the original and the mock method can return the error that the developer wants to use to test the outer function behavior. Another reason to identify external calls is that the calls may represent subsystems that are not available during unit testing. For example, a software application may be written to expect a database, other servers, and other infrastructure that are not available in a typical single-machine unit test environment. Accordingly, the call identification component 130 can identify such calls and the developer can provide replacement versions of objects or methods that use a different paradigm. For example, a developer may replace a database call with a method that returns a predefined set of data.

The call redirection component 140 replaces an identified call to a method with a call to an intercept method. The intercept method invokes the system 100 to allow the system to perform processing during handling of the method call, such as calling a unit test to modify behavior of the intercepted method. The unit test or intercept method may call the original method before or after performing unit test processing. For example, a unit test may retrieve a return value from the original method by calling the original method, and then modify the return value in some manner before passing the value back to the calling function. As another example, the unit test may replace the original method entirely and substitute its own processing for that of the original method. For methods for which the developer provides no unit test, the call redirection component 140 may generate an intercept method that simply calls the original method or may decline to redirect the method leaving the original method call in place in the cloned version of the method.

The system 100 may create a separate intercept method for each call that contains information specific to that call location, such as an identification of the original call target. Alternatively or additionally, the system 100 may provide a generic intercept method that receives variable arguments (e.g., varargs in C#). The arguments can include the original arguments of the call as well as additional parameters for passing information from the system 100 to the intercept method (e.g., the original target function address).

The unit test store 150 is a data store that stores one or more unit tests for testing the software application. The unit test store may include a declarative store of unit tests (e.g., an extensible markup language (XML) file), a separate testing module (e.g., a DLL with unit tests), or other forms of storing testing functions. The unit tests may also be stored in a database, a file system, a cloud-based storage service, or other manner of persisting data. For example, for a software project worked on by a team of developers, the team may place unit tests in a location accessible by each of the developers so that modifications to the software application can be tested using each developer's unit tests to verify correctness of the modifications.

The intercept handling component 160 receives calls to intercept functions and invokes the system 100 to perform unit testing. For example, upon receiving an intercept call, the component 160 may identify a mock unit test object a developer provided to replace an original object in the software application, and invoke the mock unit test object to perform unit testing. By cloning methods of the application and modifying the cloned methods to intercept external calls to other methods, the system 100 ensures that a developer-provided unit test function is called regardless of the type of the original method (e.g., virtual, static, and so forth) without any additional effort on the developer's part. The intercept handling component 160 receives notification that an intercepted function was called and provides the developer's unit tests with an opportunity to run and influence the behavior of the called method so that the software application can be successfully testes.

The computing device on which the unit testing system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
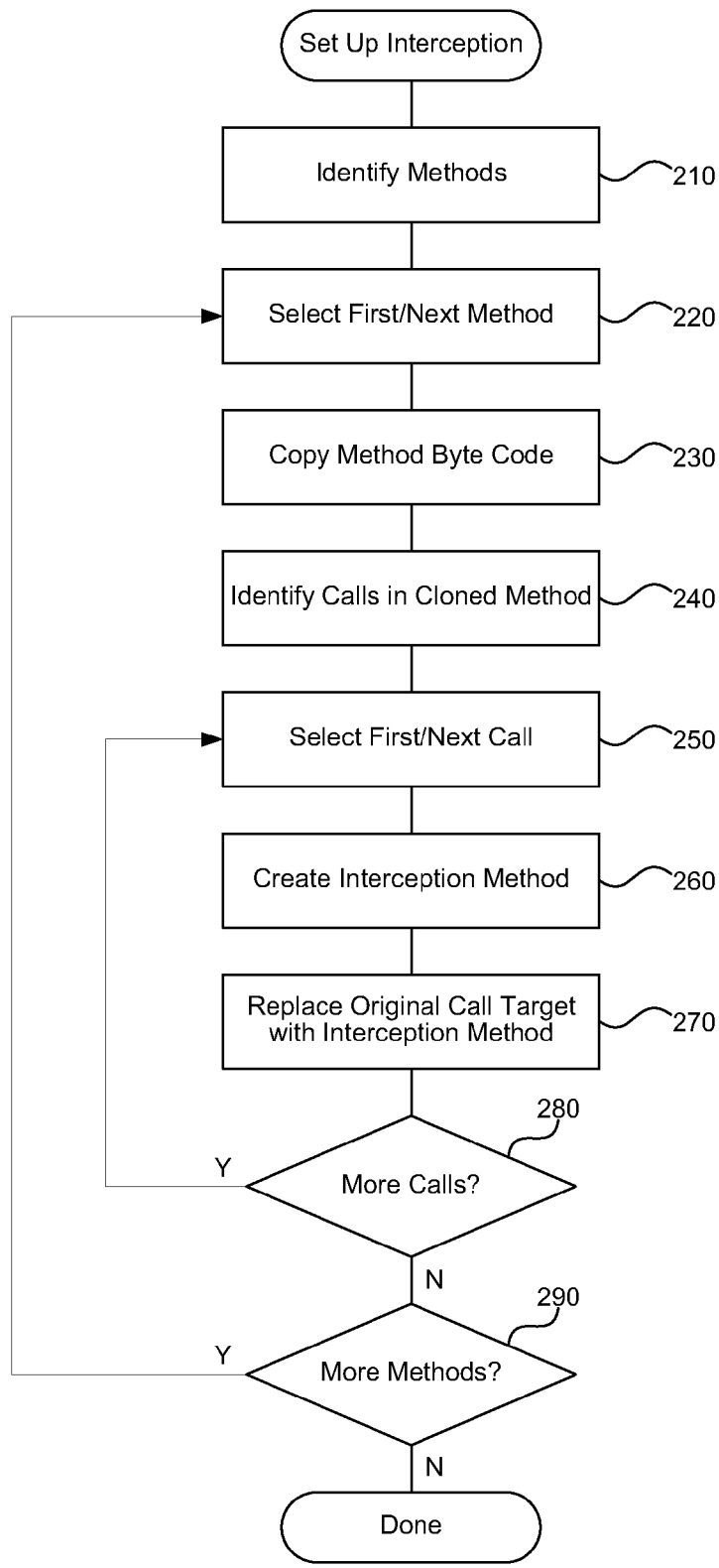
FIG. 2 is a flow diagram that illustrates processing of the unit testing system to set up interception of application methods, in one embodiment.

FIG. 2 is a flow diagram that illustrates processing of the unit testing system to set up interception of application methods, in one embodiment. Beginning in block 210, the system identifies methods of a software application module. For example, the system may load the module using an API of a virtual machine (e.g., the Java Virtual Machine) or framework (e.g., the .NET Framework) that the software application targets. The API provides a list of methods or an enumeration callback with identified methods in the module. In some embodiments, the system may start at a first method (e.g., Main) and recursively identify additional methods based on methods that the first method calls. Continuing in block 220, system selects the first method for the following steps. In subsequent iterations, the system selects the next method for processing.

Continuing in block 230, the system copies byte code of the selected method to a modifiable location. Software functions are often stored in the software application module in compiled byte code. The system copies the byte code to a new location, such as memory allocated by the system for that purpose. At the new location, the system can modify the byte code of the method to intercept calls and place hooks in the byte code to aid unit testing. Continuing in block 240, the system identifies calls to one or more inner methods in the copied selected method. Locations where one method calls another are often good locations to hook for unit testing. The system identifies calls by walking through the byte code of the selected method, either internally or by calling an API for interpreting byte code. Upon identifying a call, the system stores the original target of the call and inserts an intercept method as described herein. Continuing in block 250, the system selects the first identified inner method. In subsequent iterations, the system selects the next inner method for processing.

Continuing in block 260, the system creates an interception method to replace an original target method of the selected inner method. The interception method may include a hook function that invokes the system to identify mock objects provided by a developer to use for unit testing of the software application. The system provides an identification of the original method to the interception method, such as by hard coding it within a specific interception method or by passing an extra parameter to a generic interception method. Continuing in block 270, the system replaces the originally called inner method in the copied byte code with the created interception method so that when the selected function is invoked the interception method will be called. A method is often identified by a memory address at which the method is located, and the system can replace calls to such methods by replacing a target address with the memory address of the interception method. Because the system has cloned the original code of the selected method, the system can modify the cloned copy without harming the original method or running into memory access problems (e.g., read only code regions of memory).

Continuing in decision block 280, if there are more calls to inner methods, then the system loops to block 250 to select the next identified inner method, else the system continues at block 290. Continuing in decision block 290, if there are more identified methods in the software module, then the system loop to block 220 to select the next identified method for processing, else the system completes. After block 290, these steps conclude. Following these steps, the software module is ready for unit testing and the system will be able to hook any method calls and insert the developer's unit testing code throughout the application's execution path.

Figure 3:
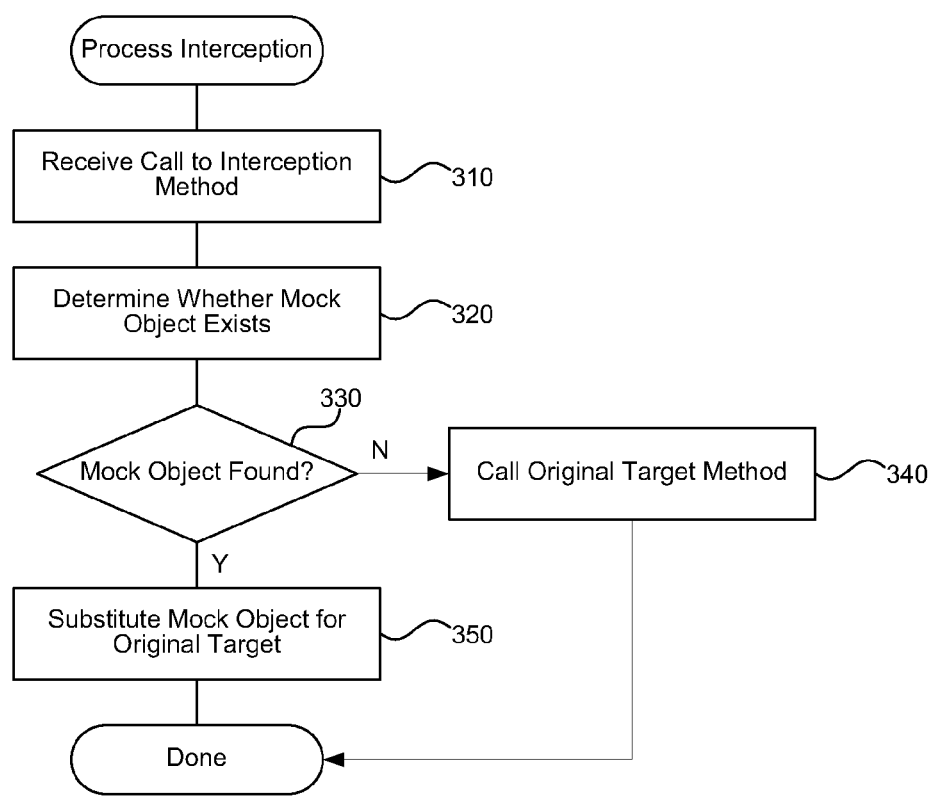
FIG. 3 is a flow diagram that illustrates processing of the intercept-handling component of the unit testing system to process a call to an intercepted method, in one embodiment.

FIG. 3 is a flow diagram that illustrates processing of the intercept-handling component of the unit testing system to process a call to an intercepted method, in one embodiment. Beginning in block 310, the component receives a call to an interception method. As described with reference to FIG. 2, the system creates interception methods for each inner method call in methods of a software application module. The interception method provides a hook so that developer-provided unit test logic can be introduced into the execution path of the software application and applicable locations. The system receives a call to the interception method when the developer invokes the software application and the software application execution reaches a location of the interception method.

Continuing in block 320, the component determines whether a mock object associated with the received interception method exists. A mock object may include a replacement function for the original method that the interception method replaced or a data object that is a parameter or otherwise related to the called location. For example, a developer may want to replace a called function with a new function during unit testing or may want to call an original function with different data during unit testing. Continuing in block 330, if a mock object exists, then the component continues at block 350 and invokes the mock object, else the component continues at block 340.

Continuing in block 340, the component invokes an original target associated with a location of the received call to the interception method. The interception method replaces an original target and provides an opportunity to hook application behavior at that location for testing. If no modification to application behavior is provided for that location, then execution simply continues as originally designed by the application. After block 340, the component completes.

Continuing in block 350, the component substitutes a mock object for an original target associated with a location of the received call to the interception method and invokes the mock object. The interception function includes logic for locating a mock object, invoking the mock object, and providing one or more results of invoking the mock object back to the callee method. After block 350, these steps conclude.

Following is an example method in a software application that a developer may want to unit test.

```
public void TestMe( )
{
    this.mClassToTest.MockMe( );
}
```

For existing unit test frameworks, the method "MockMe" is difficult or impossible to hook if "mClassToTest" is a sealed class or if "MockMe" is not a virtual method. Some frameworks attempt to dynamically create a subclass of "mClassToTest" that is modifiable, but this has limited success and will not work in many common cases. The unit testing system described herein uses the .NET Reflection API or other APIs to locate the byte code for "TestMe" and then clones the byte code to a new location where it can be modified to do anything that the unit test author wants it to do. An example of an intercept function inserted into the cloned method follows.

```
public static void TestMe (classToTest c, <original parameter>...)
{
    // Perform intercept behavior
}
```

Inside the intercept function, the system can invoke mock objects provided by the developer for unit testing. The system may also pass additional parameters to the mock object, such as reflection information retrieved using the Reflection API of an application framework, such as .NET.

Following is a real world example of how the unit testing system can be used to unit test software application code. Imagine a developer has a very simple Windows Presentation Framework (WPF) window with a CheckBox:

```
<Window x:Class="WpfApplication1.Window1"
    xmlns="http://schemas.microsoft.com/winfx/2006/xaml/presentation"
    xmlns:x="http://schemas.microsoft.com/winfx/2006/xaml"
    Title="Hello World!"
    mc:Ignorable="d"
    xmlns:d="http://schemas.microsoft.com/expression/blend/2008"
    xmlns:mc="http://schemas.openxmlformats.org/markup-compatibility/2006"
    Height="105"
    Width="181">
    <Grid>
        <CheckBox Content="Say Hello?"
            Height="16"
            Margin="12,12,0,0"
            Name="mCheckBox"
            VerticalAlignment="Top"
            HorizontalAlignment="Left"
            Width="120" />
        <Button Content="Go Ahead"
            Height="23"
            HorizontalAlignment="Left"
            Margin="12,34,0,0"
            Name="button1"
            VerticalAlignment="Top"
            Width="75"
            Click="OnButton1Clicked" />
    </Grid>
</Window>
```

Normally, testing the OnButton1Clicked event handler might be very difficult if the developer wanted to mock up the ComboBox. This is because none of ComboBox's properties or methods is virtual, so they cannot be mocked without doing lots of additional work. The unit testing system can make testing GUIs in this circumstance as trivial as using regular mock objects:

```
using System;
using System.Windows;
using System.Windows.Controls;
namespace WpfApplication1
{
    public partial class Window1 : Window
    {
        public Window1( )
        {
            InitializeComponent( );
        }
        /// <summary>
        /// Called when button1 is clicked.
        /// </summary>
        /// <param name="sender"></param>
        /// <param name="e"></param>
        public void OnButton1Clicked(object sender,
        RoutedEventArgs e)
        {
            if (this.mCheckBox.IsChecked == true)
            {
                // Test whatever ...
            }
        }
    }
}
```

And unit tests look exactly the same in this case as if the developer was using standard mock objects without cloning:

```
/// <summary>
///This is a test class for Window1Test and is intended
///to contain all Window1Test unit Tests
///</summary>
[TestClass]
public class Window1Test
{
    /// <summary>
    ///A test for OnButton1Clicked
    ///</summary>
    [TestMethod( )]
    public void OnButton1ClickedTest( )
    {
        var test = new MimicTest<Window1>( new new Window1( ));
        var mock = MockFactory.Create<ComboBox>( );
        using (Recorder.StartOrderedRecording( ))
        {
            mock.Expects(m => m.IsChecked).AndReturns(true);
        }
        test.Redirects<CheckBox>( ).ByCalling(mock);
        test.Test(t => t.OnButton1Clicked(null, null));
        Recorder.ValidateReplay( );
    }
}
```

In some embodiments, the unit testing system performs additional processing to overcome access checks by an application framework on data marked private by an application developer. For example, some versions of the .NET CLR verify access to private data at runtime such that it is difficult to mock method parameters that are marked private. To overcome this, the system can use the Reflection API or other APIs to dynamically locate class arguments and access the data intended. An access to the data through reflection is allowed by the framework even when a typical access is denied by access checking. For example, consider the following code in a unit test, "this.mField=12;" if "mField" is private, then the set may not work at runtime. The system can replace this line in the byte code with a new function "SetmField" that uses reflection to achieve the same result.

The unit testing system may also modify method calls that return a structure (e.g., struct in C#) to overcome framework checking that would otherwise thwart unit testing. Instead, the system can provide a new method with a void return that passes the structure by reference (e.g., "static void GetmField (Object this, struct& s))." When code is encountered that accesses the field (e.g., "int i=this.Field"), the system replaces the byte code with a call to the static function so that (using .NET Intermediate Language (IL)),

```
ldarg 0
ldfld field
stloc i
``` becomes

```
ldarg 0
ldloca temp
call GetField
ldloc temp
stloc i
```

In other words, the system replaces the direct access of the field with a call through GetField, which can use reflection to avoid access checking.

In some embodiments, the unit testing system hooks methods for unit testing by adding additional parameters to the methods that include mock object provided by the developer. For example, the system can include a class parameter that describes a mock object and replace calls to methods of an original class with calls to the mock object (in lieu of inserting an intercept function). For example, consider the following.

```
public void TestMe( <original parameters>, classMock c)
{
    this.mClass.CallMe( );
}
```

At runtime, the unit testing system replaces mClass with the mock class, so that the "CallMe" call goes to the mocked class instead of the original class.

From the foregoing, it will be appreciated that specific embodiments of the unit testing system have been described herein for purposes of illustration, but that various modifications may be made without deviating from the spirit and scope of the invention. Accordingly, the invention is not limited except as by the appended claims.

I claim:

1. A computer-implemented method for setting up interception of software application methods for testing, the method comprising:
    identifying one or more methods of a software application module;
    selecting a first identified method;
    copying byte code of the selected method to a modifiable location to create a modifiable copy of the selected method for unit testing without requiring modification to the selected method;
    identifying calls to one or more inner methods in the copied selected method;
    selecting a first identified inner method call;
    creating an interception method to replace an original target method of the selected inner method;
    replacing the originally called inner method in the copied byte code with the created interception method so that when the selected function is invoked the interception method is called;
    storing the modified method in a unit test store, for later retrieval in response to receiving a call to an intercept function, wherein the preceding steps are performed by at least one processor.

2. The method of claim 1 wherein identifying one or more methods comprises loading the software application module using an application programming interface (API) of a virtual machine or framework that the software application targets.

3. The method of claim 1 wherein identifying one or more methods comprises identifying a first entry method and recursively identifying additional methods that the first method calls.

4. The method of claim 1 wherein copying byte code comprises copying the selected method to memory allocated for unit testing the application.

5. The method of claim 1 wherein identifying calls comprises walking through the byte code of the selected method by calling an application programming interface (API) for interpreting byte code.

6. The method of claim 1 wherein identifying calls comprises storing an original target of the call so that the original target is accessible to the interception method.

7. The method of claim 1 wherein creating an interception method comprises creating a hook function that invokes the system to identify mock objects provided by a developer to use for unit testing of the software application.

8. The method of claim 1 wherein creating an interception method comprises providing an identification of the original method to the interception method.

9. The method of claim 1 wherein replacing the originally called inner method comprises replacing a target address with the memory address of the interception method.

10. The method of claim 1 further comprising, replacing byte code that accesses private data for which access requests are checked at runtime with reflection code that accesses the private data avoiding the access checks.

11. The method of claim 1 further comprising, repeating the steps of creating an interception method and replacing the originally called inner method for each identified call and method.

12. A computer system for unit testing software application code, the system comprising:
    a processor and memory configured to execute software instructions;
    a method identification component configured to identify methods in a software application;
    a method cloning component configured to clone an identified method to create a modifiable copy of the method for unit testing so that the system can modify the method to enhance testability without requiring modifications to the original method;
    a call identification component configured to identify calls to one or more other methods within an identified method;
    a call redirection component configured to replace an identified call to a method with a call to an intercept method by inserting the call to the intercept method into the modifiable copy of the method for unit testing;
    a unit test store configured to store one or more unit tests for testing the software application; and
    an intercept handling component configured to receive calls to intercept functions and invoke one or more stored unit tests to perform unit testing.

13. The system of claim 12 wherein the method identification component is further configured to load the module that contains byte code, interpret the byte code, and identify methods defined within the byte code.

14. The system of claim 12 wherein the method identification component is further configured to identify at least one of static functions, virtual functions, non-virtual functions, and global functions.

15. The system of claim 12 wherein the call identification component is further configured to interpret byte code of the cloned function and identify one or more instructions for calling other methods in the byte code.

16. The system of claim 12 wherein the call redirection component is further configured to generate an intercept method that invokes the intercept handling component to allow the system to call a unit test to modify behavior of the intercepted method.

17. A computer-readable storage device comprising instructions for controlling a computer system to process a call to an intercepted software method during testing, wherein the instructions, when executed, cause a processor to perform actions comprising:

receiving a call to an interception method for unit testing a software application, wherein the call to the interception method is a replacement call that has been inserted in the software method for an original call in the software method;

determining whether a mock object exists that is associated with the received interception method;

upon determining that no mock object exists for the received interception method, invoking an original target associated with a location of the received call to the interception method; and upon determining that a mock object exists for the received interception method, substituting the mock object for the original target associated with the location of the received call to the interception method and invoking the mock object.

18. The device of claim 17 wherein receiving the call to the interception method comprises receiving a call in a cloned method of the software application that includes a reference to the interception method.

19. The device of claim 17 wherein determining whether a mock object exists comprises identifying a replacement function for the original method that the interception method replaced.

20. The device of claim 17 wherein the invoked interception method includes software logic for locating the mock object, invoking the mock object, and providing one or more results of invoking the mock object back to a callee method.

* * * * *